(12) United States Patent
Jones et al.

(10) Patent No.: US 10,225,770 B2
(45) Date of Patent: *Mar. 5, 2019

(54) REPURPOSING PROTOCOL MESSAGES TO FACILITATE HANDOFF

(71) Applicant: Fortinet, Inc., Sunnyvale, CA (US)

(72) Inventors: Russ Jones, San Jose, CA (US); Berend Dunsbergen, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/435,242

(22) Filed: Feb. 16, 2017

(65) Prior Publication Data

US 2017/0188272 A1 Jun. 29, 2017

Related U.S. Application Data

(63) Continuation of application No. 13/422,043, filed on Mar. 16, 2012, now Pat. No. 9,713,045.

(51) Int. Cl.
*H04W 36/00* (2009.01)
*H04W 84/12* (2009.01)

(52) U.S. Cl.
CPC ... *H04W 36/0083* (2013.01); *H04W 36/0061* (2013.01); *H04W 36/00835* (2018.08); *H04W 84/12* (2013.01)

(58) Field of Classification Search
None
See application file for complete search history.

(56) References Cited

U.S. PATENT DOCUMENTS

| 7,826,426 B1 | 11/2010 | Bharghavan et al. |
| 2007/0104126 A1 | 5/2007 | Calhoun et al. |
| 2013/0210426 A1* | 8/2013 | Forssell ............... H04W 8/20 455/433 |

* cited by examiner

*Primary Examiner* — Yaotang Wang
(74) *Attorney, Agent, or Firm* — Law Office of Dorian Cartwright; Dorian Cartwright

(57) ABSTRACT

A control element identifies the possibility that a station will transfer to a destination AP, and prepares that destination for a handoff. The control element repurposes messages from the station which indicate a possible near-term handoff, to prepare access points to receive that handoff. The control element treats a neighbor list request as a trigger to select which AP's to identify, to restrict the neighbor list to selected AP's, and to prepare each selected AP for a handoff. In selecting a destination AP, the control element also selects a particular set of related features for the combination of that AP and BSS. When an AP receives a repurposed message, it informs the control element, which selects destination AP's for transfer. The control element treats the repurposed message like a probe request. The control element prepares more than one AP for transfer if handoff is possible to more than one AP.

13 Claims, 4 Drawing Sheets

REPURPOSING PROTOCOL MESSAGES TO FACILITATE HANDOFF

RELATED APPLICATION DATA

This application claims the benefit as a continuation of U.S. application Ser. No. 13/422,043, entitled Repurposing Protocol Messages to Facilitate Handoff and filed on Mar. 16, 2012, the contents of which is hereby incorporated in its entirety.

BACKGROUND OF THE INVENTION

In a system as described in U.S. Pat. No. 7,826,426, sometimes called a "virtual cell" system, the access points in the wireless communication system are instructed by a control element regarding which access point should service the mobile station, with the effect that the mobile station sees the system as if there was only a single access point servicing it at all times, as if the system were a single "virtual cell" rather than a multiplicity of separate cells. When the control element transfers the mobile station from one access point to another, the receiving access point receives a BSS (basic service set) ID (identifier) which has been associated with the mobile station, and prepares to service the mobile station. As described in U.S. Pat. No. 7,826,426, while a BSSID is generally an ID of a service offered by an access point, in a virtual cell system, each mobile station is assigned its own separate BSSID, which can be transferred among access points so that the mobile station appears to be constantly serviced without any transfers between access points and without any protocol messages exchanged with the mobile station to transfer between access points.

Recent IEEE 802.11 standards include a provision, in 802.11k, which allows a mobile station to request a list of locally available services (called a "neighbor list") and their BSSID's. Upon receiving the neighbor list, the mobile station can immediately contact a new access point. Before use of 802.11k, the mobile station would commonly have sent one or more probe requests, to which the control element would respond by reassigning the wireless station to a new access point. With use of 802.11k, this can pose a problem because the mobile station may no longer send any probe requests, and the control element would not know what service (if any) the wireless station is going to request and thus would not know to reassign the mobile station to a new access point. The new access point might not have yet prepared to transfer the BSSID associated with the mobile station, and might not have yet prepared to service the mobile station.

Recent IEEE 802.11 standards also include a provision, in 802.11r, which allows a mobile station to conduct a "fast handoff" from a source access point to a destination access point. For example, a mobile station might conduct a fast handoff after receiving a neighbor list as described with respect to the IEEE 802.11k standard. Similar to the ability of the mobile station in 802.11k, in 802.11r, the mobile station may connect to a destination BSSID at the destination access point without sending probe requests, and without the control element knowing ahead of time which destination access point the mobile station is about to transfer to. Similar to the ability of the mobile station in 802.11k, in 802.11r, the destination access point might not have yet prepared to transfer the BSSID associated with the mobile station, and might not have yet prepared to service the mobile station.

SUMMARY

We provide techniques in which the control element identifies the possibility that the mobile station will transfer its attention to a destination access point, and prepares the destination access point for servicing that mobile station without any requirement for one or more probe messages from the mobile station. The control element identifies one or more messages from the mobile station as indicating a possible near-term handoff, and repurposes those messages to prepare one or more access points to receive that possible near-term handoff. The repurposed messages thus have the effect of informing the control element of that possible near-term handoff, similar to probe messages that the mobile station might have otherwise sent.

In an embodiment, when a current access point receives an IEEE 802.11k request for a neighbor list from a mobile station, the access point treats the request as an implicit trigger to prepare each selected access point and selected radio for a possible handoff by the mobile station.

In one embodiment, when the mobile station's current access point receives an 802.11k request for a neighbor list, the control element treats the request for the neighbor list as an explicit trigger to determine which access points would ordinarily be identified in the neighbor list, and as an implicit trigger to (1) select one of those access points, for each BSS identified in the neighbor list, (2) restrict the neighbor list presented to the mobile station to identify only the selected access points and selected radios for those access points, and (3) prepare each selected access point and selected radio for a possible handoff by the mobile station to that access point. This has the effect that when the mobile station asks to be transferred to a new BSS, the control element is already prepared to transfer the mobile station to a selected destination access point, and the destination access point associated with that new BSS is already prepared to receive and service the mobile station.

In one embodiment, in selecting a destination access point, the control element also selects a particular set of related features for the combination of that access point and BSS. Related features can include a particular radio for the combination of that access point and BSS, a particular set of communication parameters for the combination of that access point and BSS, a particular set of QoS rules for that combination of that access point and BSS, and possible other features associated with the combination of that access point and BSS. When the control element selects a particular access point and its related features, it might make that selection (1) for communication reasons such as best available RSSI, best available QoS, or otherwise, or (2) for administrative reasons such as load sharing, security concerns, or otherwise. For example, with regard to security concerns, the control element might prefer to concentrate WPA2 connections at an access point which is best capable of servicing those WPA2 connections, or might prefer to concentrate secure connections at an access point which is physically located in a secure place, or otherwise.

In one embodiment, when an access point receives a message which the control element has repurposed to indicate a possible mobile station transfer, the access point informs the control element, and the control element selects one or more destination access points to which the mobile station might possibly be transferred. When the control element receives a repurposed message, it treats the message similarly to a probe request from the mobile station. The control element selects one or more access points to which the mobile station might possibly be transferred, and directs each of those one or more access points to prepare for the mobile station to be transferred. In one embodiment, the control element prepares more than one access point is prepared for the possible transfer, as the mobile station might initiate a handoff to more than one distinct physical access point. For example, this might occur after the mobile station makes an 802.11k request for a neighbor list, if the control element determines that different access points would receive the transfer in response to the mobile station requesting distinct services.

In one embodiment, other and further 802.11 messages, including particular 802.11k messages, might be repurposed for use by the control element. For example, in 802.11k, the access point might send a "transmit power request" message to the mobile station, to determine what transmit power the mobile station is using, with the effect of being able to calculate the power loss from the mobile station to the access point. The control element can use this information to prepare the access point for a soft handoff, and to cause the soft handoff of the mobile station from its current access point to a destination access point. Similarly, the control element might use other indicators to cause a soft handoff. For example, if an access point or the control element detect a VoIP calls at the access point without any traffic for at least 500 msec, the control element can conclude that the call has been dropped, or alternatively, can cause a soft handoff to a destination access point that is better disposed to handle the call.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Terms and Phrases

Figure 1:
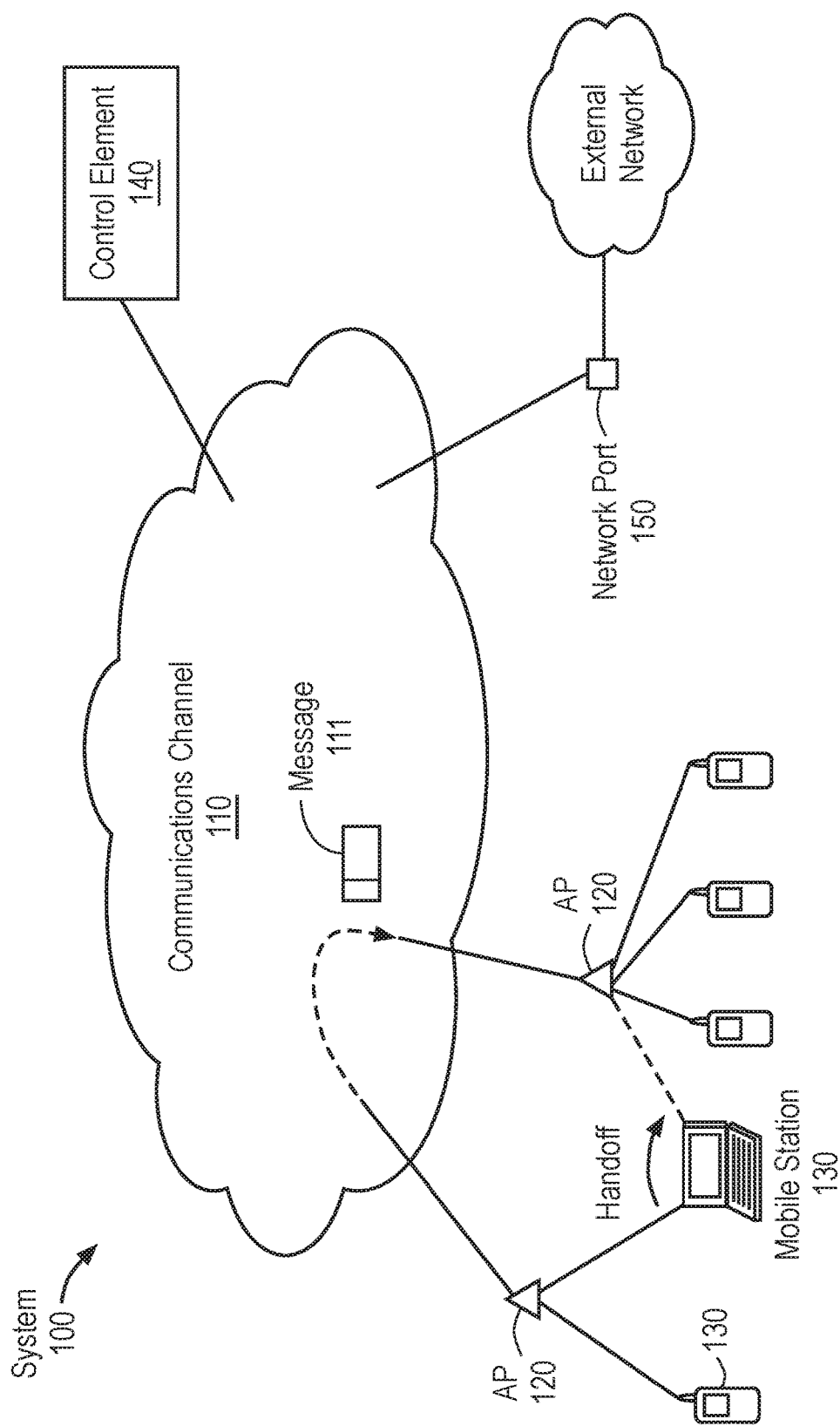
FIG. 1 is a schematic diagram illustrating a system to prepare for handoffs, according to one embodiment.

The following terms and phrases include their most general applicable form. Each is described in a manner that is illustrative, not limiting.

The phrase "access point", and the term "AP", and variants thereof, generally refers to any device capable of coupling wireless messages between a mobile station (or any other wireless device) and a wired communication medium. Access points might be coupled directly to a wired medium, such as for example a LAN or other wired network. Alternatively, access points might be coupled using a technique other than a wired medium, such as for example using other access points, wireless repeaters, or otherwise. For example and without limitation, one or more access points might be coupled to the communication system entirely using wireless communication techniques, which might themselves use an IEEE 802.11 protocol or a variant thereof.

The phrases "wireless communication", "wireless network", and variants thereof, generally refer to any method or system in which data or messages are sent, received, or maintained, using a wireless medium. For example and without limitation, the wireless medium might include electromagnetic radiation, such as radio frequencies. In one embodiment, wireless communication is performed using a communication protocol family such as IEEE 802.11, or a variant thereof. However, in the context of the invention, there is no particular requirement for any such limitation. For example, wireless communication might be performed using any technique not tethered by wire.

The phrases "mobile station," "station," "wireless station", and variants thereof, generally refer to any end-user device capable of communicating using wireless messages in a wireless communication system. For example and without limitation, wireless stations might include cellular phones, laptop computers, netbooks (such as the "iPad"), or other devices. Mobile stations might or might not be physically mobile, or might or might not be physically stationary.

Generality of the Description

Technologies shown or suggested by this description should also be thought of in their most general possible form. This includes, without limitation, the following:

The phrases and terms "constantly," "continually," "from time to time," "occasionally," "periodically", and similar phrases and terms, generally indicate any case in which a method or technique, or an apparatus or system, operates over a duration of time, including without limitation any case in which that operation occurs only part of that duration of time. For example and without limitation, these terms would include, without limitation, methods which perform an operation as frequently as feasible, on a periodic schedule such as once per second or once per day, in response to an alarm or trigger such as a value reaching a threshold, in response to a request or an implication of a request, in response to operator intervention, otherwise, and to combinations and conjunctions thereof.

The phrases and terms "in one embodiment," "one embodiment," and similar phrases and terms, generally indicate that a particular characteristic, feature, or structure, described herein is included in at least one embodiment of the invention. Uses of these phrases herein do not necessarily all refer to the same embodiment. Rather, the specific particular characteristic, feature, or structure, described herein might be combined in any suitable manner into one or more distinct possible embodiments.

The phrases and terms "methods, physical articles, and systems," "techniques", and similar phrases and terms, generally indicate any material suitable for description, including without limitation all such material within the scope of patentable subject matter, or having ever been considered within the scope of patentable subject matter, or which might colorably be within the scope of patentable subject matter, notwithstanding most recent precedent.

The term "relatively", and similar phrases and terms, generally indicates any relationship in which a comparison is possible, including without limitation "relatively less," "relatively more," and the like. In the context of the invention, where a measure or value is indicated to have a relationship "relatively," that relationship need not be precise, need not be well-defined, need not be by comparison with any particular or specific other measure or value. For example and without limitation, in cases in which a measure or value is "relatively increased" or "relatively more," that comparison need not be with respect to any known measure or value, but might be with respect to a measure or value held by that measurement or value at another place or time.

The term "substantially", and similar phrases and terms, generally indicates any case or circumstance in which a determination, measure, value, or otherwise, is equal, equivalent, nearly equal, nearly equivalent, or approximately, what the measure or value is recited. The terms "substantially all" and "substantially none" and similar phrases and terms, generally indicate any case or circumstance in which all but a relatively minor amount or number (for "substantially all") or none but a relatively minor amount or number (for "substantially none") have the stated property. The terms "substantial effect" and similar phrases and terms, generally indicate any case or circumstance in which an effect might be detected or determined.

The phrases "this application," "this description", and similar phrases and terms, generally indicate any material shown or suggested by any portions of this application, individually or collectively, including all documents incorporated by reference or to which a claim of priority can be made or is made, and include all reasonable conclusions that might be drawn by those skilled in the art when this application is reviewed, even if those conclusions would not have been apparent at the time this application is originally filed.

The invention is not in any way limited to the specifics of any particular examples disclosed herein. After reading this application, many other variations are possible which remain within the content, scope and spirit of the invention; these variations would be clear to those skilled in the art, without undue experiment or new invention.

Figures And Text

FIG. 1

FIG. 1 is a schematic diagram illustrating a system to prepare for handoffs, according to one embodiment.

A wireless communication system 100 includes elements shown in the FIG. 1, including at least a wireless communication channel 110, one or more access points 120, one or more mobile stations 130, one or more control elements 140, and possibly other elements. The communication system 100 optionally includes other and further elements, such as for example one or more external network ports 150 disposed to be coupled to an external network, or otherwise.

The wireless communication channel 110 includes a physical communication layer, such as for example an IEEE 802.11 protocol transport layer, or a variant thereof. The physical communication layer provides devices coupled to the communication system 100 the ability to exchange messages 111 with at least some other devices coupled to the communication system 100. Messages 111 exchanged within the communication system 100 include payload messages, which include information to be exchanged between a sending device and receiving device, and protocol messages, which include information used to facilitate operation of the communication system 100. For example, protocol messages include probe messages (not shown), sent by mobile stations 130 to request the identity and location of nearby access points 120, and beacons (not shown), sent by access points 120 to identify those access points 120 as available to offer services to mobile stations 130.

Assignment of Access Points

The control element 140 determines, for each mobile station 130, which access point 120 should service that mobile station 130. From time to time, the control element 140 might transfer that mobile station 130 from a first access point 120 to a second access point 120 (the second access point sometimes referred to herein as a "destination" access point 120). As described in U.S. Pat. No. 7,826,426 (which is hereby incorporated by reference), the control element 140 associates each mobile station 130 with a BSSID (basic service set identifier) unique to that mobile station 130, and directs the one access point 120 selected by the control element 140 to advertise that BSSID, with the effect that the mobile station 130 is selects the one access point 120 advertising its BSSID as its servicing access point 120. This has the effect that, even though the IEEE 802.11 protocol family intends that the mobile station 130 selects the best access point 120 to service it, in fact it is the control element 140 which selects the best access point 120 to service that mobile station 130.

For example, when the mobile station 130 changes its position, or otherwise changes its electromagnetic transmission or reception profile, with respect to one or more access points 120, it might occur that the control element 140 determines that the mobile station 130 would be better assigned to a different access point 120. For example, the access points 120 might become more evenly loaded, or the mobile station 130 might receive better service. When this occurs, the control element 140 causes the first access point 120 servicing the mobile station 130, sometimes referred to herein as the "current" access point 120, to stop servicing that mobile station 130, and directs a second access point 120, sometimes referred to herein as the "destination" access point 120, to start servicing that mobile station 130. In one embodiment, the control element 140 directs the first access point 120 to remove the BSSID associated with that mobile station 130 from its internal tables, and directs the second access point 120 to add the that BSSID to its own internal tables. As described in U.S. Pat. No. 7,826,426, this is sometimes referred to as a "soft handoff" of the mobile station 130 from the first access point 120 to the second access point 120.

There are some protocol messages 111 which indicate that the mobile station 130 may request an explicit handoff from the first access point 120 to a different access point 120. For example, the destination access point 120 might have a particular service available which the first access point 120 does not. Even though the mobile station 130 does not know by which access point 120 it is serviced, when the mobile station 130 requests a service not provided by its current access point 120, the control element 140 concludes that there will be a handoff from the current access point 120 to some destination access point 120. When this occurs, the mobile station 130 conducts a protocol exchange with the destination access point 120, in which the mobile station 130 and the destination access point 120 identify themselves to each other and establish a connection. As described in U.S. Pat. No. 7,826,426, this is sometimes referred to as a "hard handoff" of the mobile station 130 from the first access point 120 to the second access point 120.

Even when a hard handoff is conducted, the control element 140 selects which access point 120 will be the destination access point 120. That is, the control element 140 selects which access point 120 to associate with the mobile station 130. The control element 140 can transfer the mobile station 130 to a new destination access point 120 from time to time, as the control element 140 determines that transfer would promote communication within the communication system 100. The control element 140 can make that determination in response to whether that transfer would result in superior communication between the mobile station 130 and its destination access point 120, or superior load balancing among access points 120, or otherwise.

FIG. 2

Figure 2:
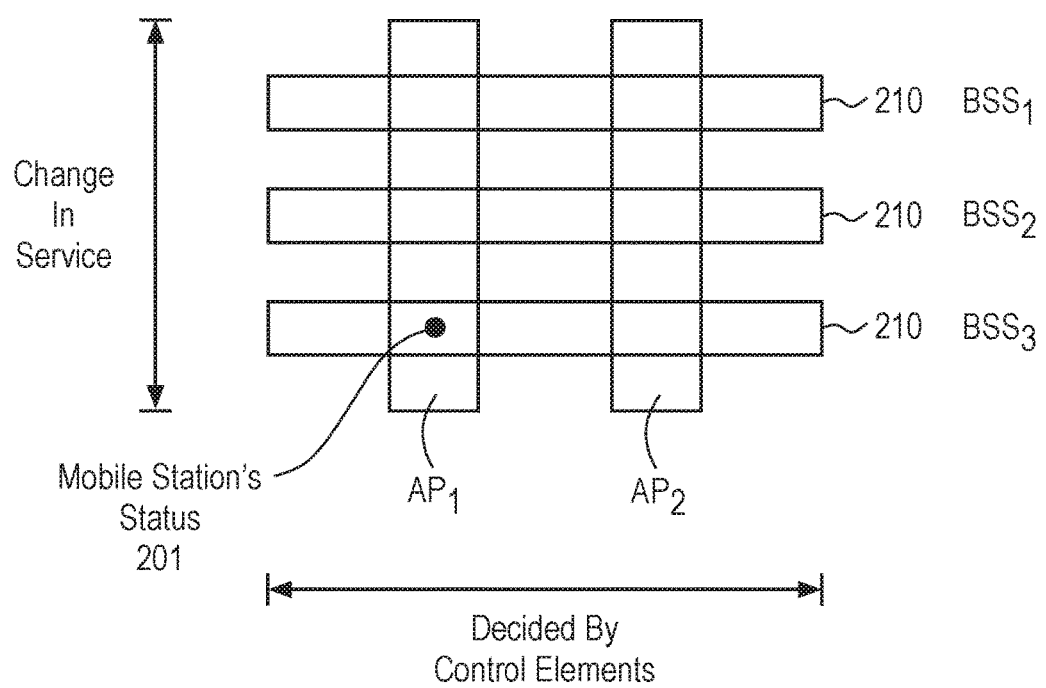
FIG. 2 is a schematic diagram illustrating handoffs of a mobile station, according to one embodiment.

FIG. 2 is a schematic diagram illustrating handoffs of a mobile station, according to one embodiment.

In the conceptual diagram, the mobile station's status 201 is represented by its assignment to a particular access point 120 and by its assignment to a particular BSS 210.

Movement of the mobile station's status 201 from a first access point 120 to a second access point 120 represents a soft handoff, as described above. Soft handoffs are generally initiated by the control element 140 in response to service requirements, such as for example a worse connection to the first access point 120 and a better connection to the second access point 120. This would be represented in the figure by a horizontal move, that is, a change from a current access point 120 to a destination access point 120, without any change in BSS 210.

Movement of the mobile station's status 201 from a first BSS 210 to a second BSS 210 represents a change in particular services requested by the mobile station 130, such as for example a request to place a VoIP call instead of a data transfer connection, which might involve a change to a different BSS 210. Movement from a first BSS 210 to a second BSS 210 generally involves a hard handoff. This would be represented in the figure by a vertical move, that is, a change from a current BSS 210 to a destination BSS 210, possibly without any change in the access point 120 servicing the mobile station 130.

Although the hard handoff is initiated by the mobile station 130 having requested a different BSS 210, the control element 140 performs the selection of which access point 120 will service the mobile station 130 on that BSS 210. For example, it can occur that the same access point 120 is able to service the mobile station 130 on the destination BSS 210. If it occurs that a new access point 120 should service the mobile station 130 on the destination BSS 210, this would be represented in the figure both by a vertical move of the mobile station 130, from a current BSS 210 to a destination BSS 210, and by a horizontal move of the mobile station 130, from a current access point 120 to a destination access point 120.

Repurposed Messages

As noted above, when the mobile station 130 sends a message requesting a neighbor list, the access point 120 receiving that request reports the request to the control element 140. The control element 140 thus becomes aware that the mobile station 130 may request a change from its current BSS 210 to a destination BSS 210. Moreover, the control element 140 thus becomes aware that the mobile station 130 may attempt a handoff from its current BSS 210 to one of the BSS 201s provided in the neighbor list, and that, because the control element 140 does not know ahead of time which of those BSS 210s will be selected by the mobile station 130, all access points 210 providing service via the BSS 210s sent in the neighbor list should be prepared for a possible handoff.

The control element 140 treats the request for a neighbor list similarly to a probe request from the mobile station 130. This has the effect that the request for a neighbor list has been given an additional purpose, such as for example to cause the control element 140 to prepare destination access points 120 as if in response to a probe request. Upon receiving the request for a neighbor list, the control element 140 performs the following steps:

The control element 140 identifies each BSS 210 available to the mobile station 130.

For each of those BSS's 210, the control element 140 selects one access point 120 to service that BSS 210. This has the effect that, even though the mobile station 130 makes the request for a new BSS 210, the control element 140 makes the actual selection of the destination access point 120 to provide service via the selected BSS 210.

Along with selecting a particular access point 120 to service that BSS 210, the control element 140 also selects communication parameters for use with that access point 120. Some communication parameters include: (1) which radio at that access point 120 with which to communicate, (2) which data rate and transmission power parameters, (3) which QoS service level should be used. The control element 140 might also select other communication parameters, such as possibly access control or security parameters to be used for communication. One advantage over the prior art is that parameters can be set up before an actual handoff in order to reduce the set-up time during the actual handoff.

For each particular access point 120 selected, whether for one of those BSS's 210 or for several, the control element 140 prepares that access point 120 for a handoff of the mobile station 130 from the current access point 120 to that particular access point.

In one embodiment, the control element 140 sends a message to each destination access point 120 directing it to expect a handoff of the mobile station 130. The control element 140 sends the BSS ID associated with the mobile station 130, so the access point 120 can perform as the new access point 120 with which the mobile station 130 communicates when the mobile station 130 exchanges messages with the communication system 100.

After each selected access point 120 receives the message from the control element 140, and has prepared for a handoff of the mobile station 130, the control element 140 sends a message to the current access point 120, providing the neighbor list to be returned to the mobile station 130. The neighbor list can be formatted according to the IEEE 802.11k standard and includes, for example, what BSSIDs are available, what channels they are available on, and the service offered by those BSSIDs (e.g., WPA2, clear-text, etc.), among other fields.

Once all access points 120 have been prepared, the neighbor list is returned to the mobile station 130, which is then able, but not required, to select one of those destination BSS's 210, with the effect of selecting the destination access point 120 selected by the control element 140 to service that destination BSS 210, for handoff.

The mobile station 130 is able to contact the destination access point 120 for a "fast handoff", according to IEEE 802.11r. Should it do so, the destination access point 120 has been already prepared to receive that fast handoff, and is already prepared to provide service for that mobile station 130. For example, resources such as a radio of an access point can be allocated before the handoff. Other resources to guarantee a certain QoS may also be pre-allocated (e.g., bandwidth, type of traffic, etc.).

FIG. 3

Figure 3:
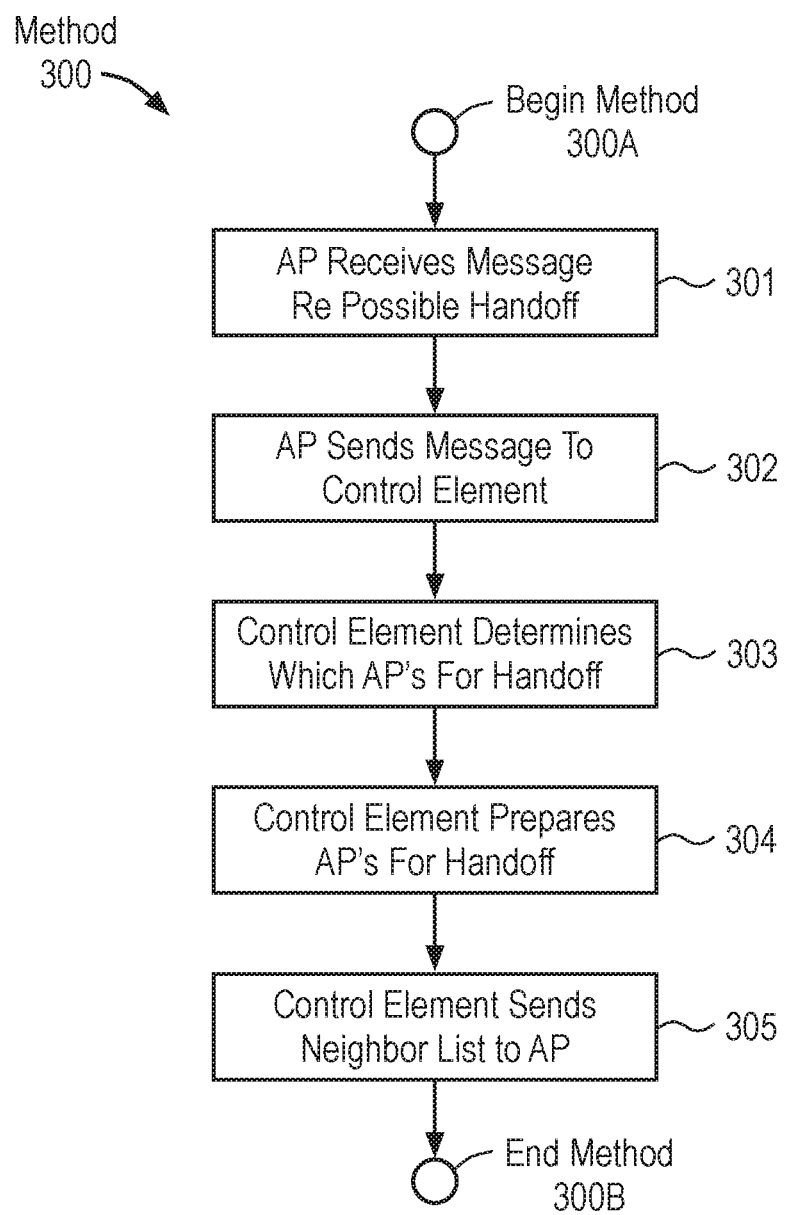
FIG. 3 is a block diagram illustrating a method for preparing for handoffs, according to one embodiment.

FIG. 3 is a block diagram illustrating a method for preparing for handoffs, according to one embodiment.

A method 300 includes flow points and method steps as shown in the figure, including at least those described below.

A flow point 300A indicates a beginning of the method 300.

At a step 301, an access point 120 exchanging messages with a mobile station 130 receives a message from that mobile station 130 indicating the possibility that the mobile station 130 will attempt a fast handoff in the near future. For example, as described above, the mobile station 130 could send a request for a neighbor list to the access point 120.

At a step 302, the servicing access point 120, that is, the access point 120 receiving that message, sends a message to the control element 140 indicating that the servicing access point 120 has received a message from the mobile station 130 indicating the possibility of a fast handoff in the near future.

At a step 303, the control element 140 receives the message from the access point 120, and determines to which new access point 120 to which it would handoff the mobile station 130, if the mobile station 130 requested a fast handoff at this time.

In one embodiment, the control element 140 performs this function in addition to any other function which might be requested by the message from the mobile station 130. For example, if the servicing access point 120 receives a neighbor list request, the control element 140 also generates a response to the neighbor list request, which it will send to the access point 120 after repurposing the neighbor list request as a fast handoff precursor.

Further, the control element 140 identifies each BSS 210 available to the mobile station 130. For each of those BSS's 210, the control element 140 can select one access point 120 to service that BSS 210. In some embodiments, the control element 140 also selects communication parameters for use with that access point 120.

At a step 304, for each possible access point 120 which might next receive a fast handoff message, the control element 140 prepares the access point 120 for a handoff of the mobile station 130 from the current access point 120 to that particular access point. In one embodiment, the control element 140 sends the BSS ID associated with the mobile station 130 to the access point 120.

At a step 305, after each selected access point 120 receives the message from the control element 140, and has prepared for a handoff of the mobile station 130, the control element 140 sends a message to the current access point 120, providing the neighbor list to be returned to the mobile station 130.

Figure 4:
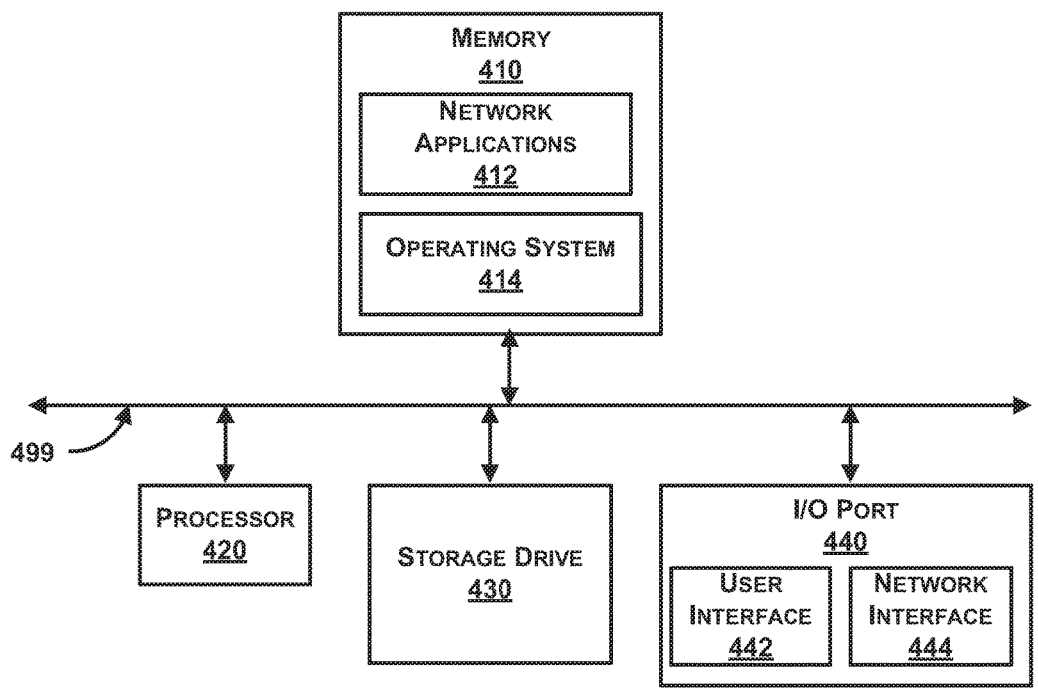
FIG. 4 is a block diagram illustrating an exemplary computing device 400 for use in the system 100 of FIG. 1, according to one embodiment

FIG. 4 is a block diagram illustrating an exemplary computing device 400 for use in the system 100 of FIG. 1, according to one embodiment. The computing device 400 is an exemplary device that is implementable for each of the components of the systems 100A and B, including the access points 120, the mobile station 130 and the control element 140. Additionally, the computing device 400 is merely an example implementation itself, since the system 100 can also be fully or partially implemented with laptop computers, tablet computers, smart cell phones, Internet appliances, and the like.

The computing device 400, of the present embodiment, includes a memory 410, a processor 420, a storage drive 430, and an I/O port 440. Each of the components is coupled for electronic communication via a bus 499. Communication can be digital and/or analog, and use any suitable protocol.

The memory 410 further comprises network applications 412 and an operating system 414. The network applications 412 can include network modules customized for a particular device such as the access points 120, the mobile station 130 or the control element 140. Other network applications 412 can include 412 a web browser, a mobile application, an application that uses networking, a remote application executing locally, a network protocol application, a network management application, a network routing application, or the like.

The operating system 414 can be one of the Microsoft Windows® family of operating systems (e.g., Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 420 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 420 can be single core, multiple core, or include more than one processing elements. The processor 420 can be disposed on silicon or any other suitable material. The processor 420 can receive and execute instructions and data stored in the memory 410 or the storage drive 430.

The storage drive 430 can be any non-volatile type of storage such as a magnetic disc, EEPROM, Flash, or the like, or even a virtual drive stored on a network. The hard drive 430 stores code and data for applications.

The I/O port 940 further comprises a user interface 442 and a network interface 444. The user interface 442 can output to a display device and receive input from, for example, a keyboard. The network interface 444 connects to a medium such as Ethernet or Wi-Fi for data input and output. In one embodiment, the network interface 444 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Java, JavaScript, PHP, Python, Perl, Ruby, and AJAX. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer implemented method in an access point of a wireless communication network comprising a controller that manages a plurality of access points servicing wireless connections to mobile stations, the method for preparing for possible near-term handoffs among wireless connections of the plurality of access points prior to actual handoffs, the method comprising the steps of:
   receiving a request for an access point neighbor list at the access point from a mobile station, on the wireless communication network, the access point having a first wireless connection to the mobile station;
   identifying the mobile station for a possible near-term handoff from the first wireless connection to a second wireless connection;
   identifying one or more destination access points from the plurality of access points that are available for the possible near-term handoff of the first wireless connection of the mobile station;
   providing the one or more identified destination access points to the mobile station that requested the neighbor list;
   preconfiguring communication parameters of the one or more identified destination access points; and
   in response to the request for the neighbor list received from the mobile station, sending to the controller managing the plurality of access points, an identification of the mobile station that is potentially handing off, allowing the controller to select one of the one or more identified destination access points, based on the preconfigured communication parameters, to service the mobile station after handing off the first wireless connection to the second wireless connection, and allowing the controller to direct the one selected destination access point to configure for servicing of the mobile station after handing off the first wireless connection to the second wireless connection from the access point, prior to an actual handoff of the first wireless connection to the second wireless connection,
   wherein the configuration of the one selected destination access point directed by the controller comprises sending a basic service set identifier (BSSID) associated with the mobile station to the one selected destination access point responsive to the request for the access point neighbor list from the mobile station.

2. The method of in claim 1, wherein the directing the one selected destination access point comprises:
   directing the one selected destination access point to allocate resources for the mobile station.

3. The method of claim 1, wherein the neighbor list request is in accordance with the IEEE (Institute of Electrical and Electronics Engineers) 802.11k standard.

4. The method of claim 1, further comprising:
   selecting one of the one or more destination access points that is preferred by the controller for the possible near-term handoff, wherein the selection includes less than a complete list of neighboring access points,
   wherein directing the one selected destination access points comprises directing the selected one of the one or more destination access points.

5. The method of claim 1, further comprising:
   sending a request response to the mobile station,
   wherein the response comprises less than a complete list of neighboring access points.

6. The method of claim 1, further comprising:
   sending a request response to the mobile station,
   wherein the response comprises a set of communication parameters to use with the one selected destination access point.

7. The method of claim 1, comprising:
   sending a request response to the mobile station;
   wherein the request response comprises a controller-preferred Basic Service Set (BSS) for each service on the wireless network.

8. The method of claim 1, comprising:
   sending a request response to the mobile station;
   wherein the request response comprises a new BSS that is also associated with the current access point.

9. The method of claim 1, comprising:
   sending a request response to the mobile station;
   wherein the mobile station performs a fast handoff based on the request response in accordance with the IEEE 802.11r standard.

10. The method of claim 1, further comprising:
    receiving, at the one or more destination access points, communications associated with a handoff.

11. The method of claim 1, wherein the directing the one selected destination access point comprises:
    directing one or more particular radios associated with the one or more destination access points to prepare for the possible near-term handoff.

12. A non-transitory computer-readable medium storing instructions that when executed by a processor, to perform a computer implemented method in an access point of a wireless communication network comprising a controller that manages a plurality of access points servicing wireless connections to mobile stations, the method for preparing for possible near-term handoffs among wireless connections of the plurality of access points prior to actual handoffs, the method comprising:
    receiving a request for an access point neighbor list at the access point from a mobile station, on the wireless communication network, the access point having a first wireless connection to the mobile station;
    identifying the mobile station for a possible near-term handoff from the first wireless connection to a second wireless connection;
    identifying one or more destination access points from the plurality of access points that are available for the possible near-term handoff of the first wireless connection of the mobile station;
    providing the one or more identified destination access points to the mobile station that requested the neighbor list;
    preconfiguring communication parameters of the one or more identified destination access points; and in response to the request for the neighbor list received from the mobile station, sending to the controller managing the plurality of access points, an identification of the mobile station that is potentially handing off, allowing the controller to select one of the one or more identified destination access points, based on the preconfigured communication parameters, to service the mobile station after handing off the first wireless connection to the second wireless connection, and allowing the controller to direct the one selected destination access point to configure for servicing of the mobile station after handing off the first wireless connection to the second wireless connection from the access point, prior to an actual handoff of the first wireless connection to the second wireless connection, wherein the configuration of the one selected destination access point directed by the controller comprises sending a basic service set identifier (BSSID) associated with the mobile station to the one selected destination access point responsive to the request for the access point neighbor list from the mobile station.

13. An access point, of a wireless communication network comprising a controller that manages a plurality of access points servicing wireless connections to mobile stations, for preparing for possible near-term handoffs among wireless connections of the plurality of access points prior to actual handoffs, the access point comprising:

a processor; and a memory, comprising:

a first module to receive a request for an access point neighbor list at the access point from a mobile station, on the wireless communication network, the access point having a first wireless connection to the mobile station;

a second module to identify the mobile station for a possible near-term handoff from the first wireless connection to a second wireless connection;

a third module to identify one or more destination access points from the plurality of access points that are available for the possible near-term handoff of the first wireless connection of the mobile station;

a fourth module to provide the one or more identified destination access points to the mobile station that requested the neighbor list;

a fifth module to provide communication parameters of the one or more identified destination access points are preconfigured; and in response to the request for the neighbor list received from the mobile station, a fifth module to send to the controller managing the plurality of access points, an identification of the mobile station that is potentially handing off, allowing the controller to select, based on the preconfigured communication parameters, one of the one or more identified destination access points to service the mobile station after handing off the first wireless connection to the second wireless connection, and allowing the controller to direct the one selected destination access point to configure for servicing of the mobile station after handing off the first wireless connection to the second wireless connection from the access point, prior to an actual handoff of the first wireless connection to the second wireless connection, wherein the configuration of the one selected destination access point directed by the controller comprises sending a basic service set identifier (BSSID) associated with the mobile station to the one selected destination access point responsive to the request for the access point neighbor list from the mobile station.

* * * * *